United States Patent [19]

Herrington

[11] Patent Number: 5,088,971
[45] Date of Patent: Feb. 18, 1992

[54] METHOD OF MAKING PROTRUDING END STOPS FOR PLASTIC RECLOSABLE FASTENER

[75] Inventor: Fox J. Herrington, Holcomb, N.Y.

[73] Assignee: Mobil Oil Corporation, Fairfax, Va.

[21] Appl. No.: 674,649

[22] Filed: Mar. 22, 1991

[51] Int. Cl.$^5$ .......................... B31B 1/64; B31B 49/04
[52] U.S. Cl. .................................. 493/203; 493/209; 493/215; 493/927
[58] Field of Search ............... 493/189, 190, 199, 200, 493/203, 206, 207, 209, 210–215, 227, 237, 238, 927

[56] References Cited

U.S. PATENT DOCUMENTS

| | | | |
|---|---|---|---|
| 3,470,795 | 10/1969 | Davis, Jr. | 493/190 |
| 3,986,914 | 10/1976 | Howard | 493/209 X |
| 4,015,223 | 5/1971 | Boeckmann | 493/199 X |
| 4,581,006 | 4/1986 | Hugues et al. | 493/213 |
| 5,019,027 | 5/1991 | Boeckmann et al. | 493/206 X |

Primary Examiner—Bruce M. Kisliuk
Assistant Examiner—John A. Marlott
Attorney, Agent, or Firm—Alexander J. McKillop; Charles J. Speciale

[57] ABSTRACT

A method is disclosed for making end terminations for a plastic reclosable fastener or zipper, which incorporates a stop for the zipper slider wherein the zipper profile is cut apart with a hot knife which forces the melted material into cavities forming the end stops.

5 Claims, 2 Drawing Sheets

METHOD OF MAKING PROTRUDING END STOPS FOR PLASTIC RECLOSABLE FASTENER

BACKGROUND OF THE INVENTION

The present invention relates to plastic reclosable fasteners with sliders for opening and closing the reclosable fasteners on plastic bags and the like and particularly to the method of making protruding end stops on the reclosable fastener to prevent travel of the slider past the ends of the fastener.

Plastic reclosable fasteners or zippers with sliders are well known in the art. The plastic zippers have profiles and include a pair of male and female fastener elements in the form of reclosable interlocking rib and groove elements with a slider for opening and closing the rib and groove elements. In the manufacture of thermoplastic film bags, a pair of these male and female fastener elements extend along the mouth of the bag and these male and female elements are adapted to be secured in any suitable manner to the flexible walls of the thermoplastic film bags. These elements may be integral marginal portions of such walls or they may be extruded separately and thereafter attached to the walls along the mouth of the bag. Various arrangements have been utilized heretofore to maintain the slider on the zipper. In one of the more conventional arrangements the slider includes a separator finger that extends down between the integral locking rib and groove elements as the slider is moved from one edge of the bag to the other edge of the bag. When the bag is opened, the only thing to stop the slider was the side seam at the edge of the bag when the slider finger comes into contact with it. This prior art is described in U.S. Pat. No. 3,790,992. In that patent there is disclosed an improvement wherein the heat seals that join the rib and groove elements are wider at one end than the second edge of the bag and the wider seal being of a width at least equal to the length of the slider from its closing end to the finger so that the slider will remain fully on the bag at the end of its travel when opening the bag. The patent points out that these seal areas provide stops for the slider. Another arrangement for providing stops at the end of the zipper is disclosed in U.S. Pat. No. 3,259,951. In that patent the opposite ends of the interlocking or mating strips are permanently joined or sealed to each other at the ends with stop members sealed between the opposite ends of these members to stop the longitudinal movement of the slider therealong.

It would be desirable to provide a plastic bag having a zipper that is operated by a slider wherein the zipper is terminated with protruding end stops formed from the zipper to prevent the slider from moving off past the ends of the zipper. With this arrangement it is not necessary to add an additional stop element to the zipper nor to rely on the strength of the seam at the edge of the bag for preventing the slider from moving past the ends of the bag. It would also be desirable to do this by a method that does not slow down the manufacturing process.

RELATED APPLICATIONS

A process for making protruding end stops for plastic reclosable fasteners by ultrasonically smashing the ends of the fastener is disclosed in the related application of F. J. Herrington and Eric A. St. Phillips entitled "Protruding End Stops for Plastic Reclosable Fastener", Ser. No. 673,706 filed Mar. 22, 1991. A plastic reclosable fastener with end clamps to seal the ends of the fastener and to provide stops to retain the slider on the fastener is disclosed in the related application of F. J. Herrington and Eric A. St. Phillips entitled "End Clamp Stops for Plastic Reclosable Fastener", Serial No. 673,712 filed Mar. 22, 1991. A plastic reclosable fastener with self-locking slider is disclosed in the related application of F. J. Herrington and Eric A. St. Phillips entitled "Plastic Reclosable Fastener with Self-Locking Slider" Serial No. 673,707 filed Mar. 21, 1991. The disclosures in these related applications are incorporated herein by this reference thereto. All Of these applications are assigned to the same assignee as the present application. The present invention is an improvement over the process disclosed in the aforesaid application Ser. No. 673,706.

SUMMARY OF THE INVENTION

It is an object of the present invention to provide an improved method for making an end termination for a zipper which incorporates a stop for the slider by severing the plastic zipper profile with a hot knife and forcing the melted plastic into cavities forming the end stops.

In accordance with the invention there is provide in the manufacture of thermoplastic bags from thermoplastic sheets having an opening with a reclosable fastener extending therealong including a slider for straddling the fastener for opening and closing the fastener, the fastener comprising a pair of flexible plastic strips connected to the walls of the bag and having reclosable interlocking male and female profile elements on the respective strips, the method of forming end stops for the slider comprising clamping together a pair of the flexible plastic strips between clamps at a seal area at the ends of the bag, the clamps having pockets therein adjacent the profile elements at the seal area, severing and heating the profile elements at the seal area with a heated knife to transform the severed ends of the profile elements into molten material and pressing the molten material into the pockets in the clamps thereby increasing the thickness of an area of the reclosable fastener adjacent the seal area to provide protruding end stops for preventing movement of the slider past the ends of the bag.

DESCRIPTION OF THE PREFERRED EMBODIMENT

Figure 1:
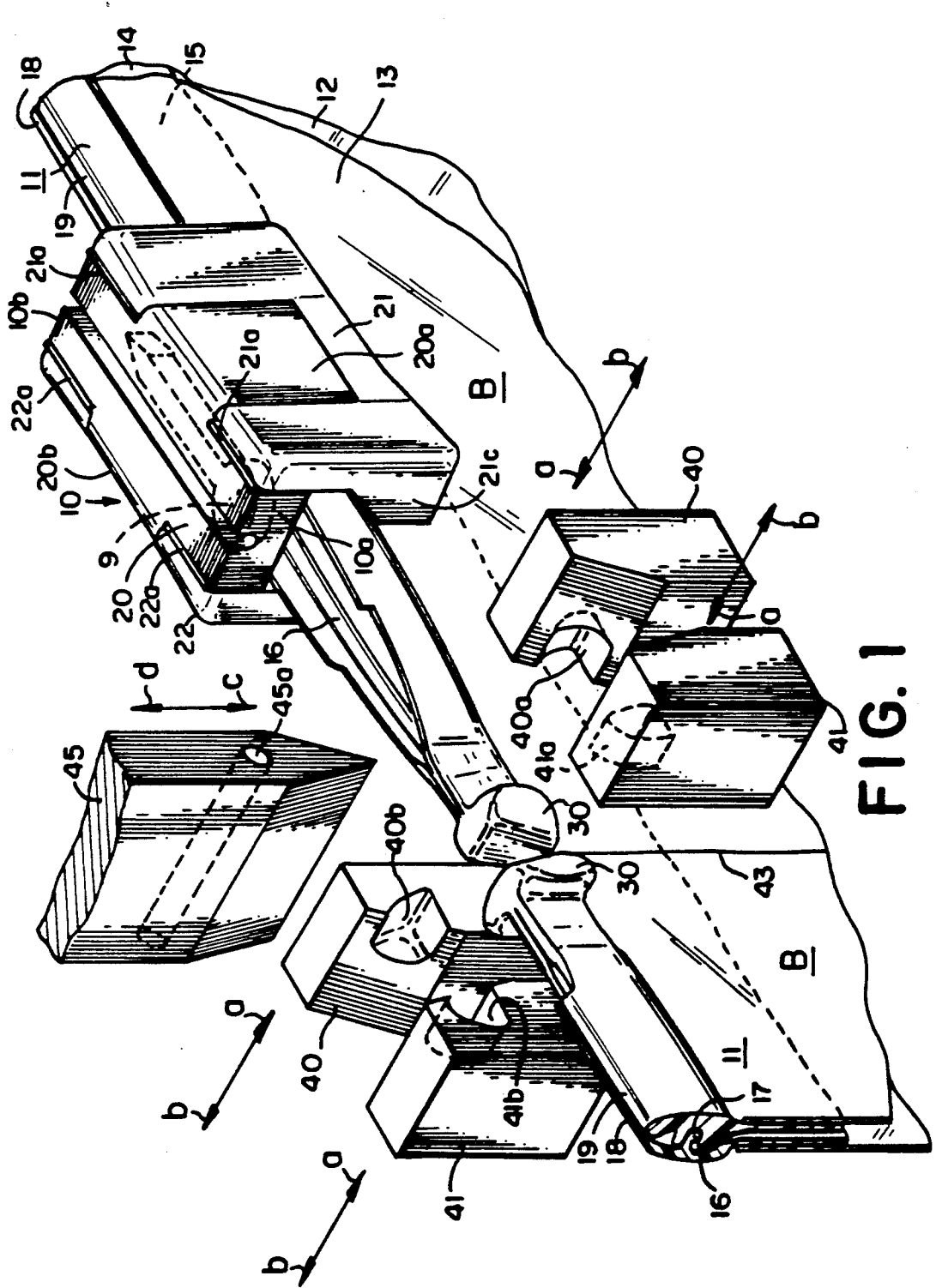
FIG. 1 is a perspective view showing apparatus for performing the method of forming protruding end stops on a plastic reclosable fastener in accordance with the present invention.

Referring to FIG. 1, there is illustrated a thermoplastic bag B having a plastic slider 10 and a profiled plastic reclosable fastener or zipper 11 with end stops 30 produced in accordance with the method of the present invention. In FIG. 1 the slider 10 has been illustrated at the left hand end of the zipper 11 which is the closed end. The right hand end of the zipper 11 which is the open end of the zipper also has an end stop 30 which is shown on the adjacent bag B, in FIG. 1. In opening and closing the zipper 11 it will be understood that the slider 10 will move from the closed end in FIG. 1 to the opened end and vice versa. The bag B may be made from any suitable thermoplastic film such for example as polyethylene or polypropylene or equivalent material. The bag B is formed by a pair of flexible plastic sheets 12 and 13 joined at the bottom and having a top edge, with a pair of flexible plastic strips 14 and 15 having separable plastic means extending along the length thereof comprising reclosable interlocking male and female profile elements in the form of rib and groove elements 16 and 17 on the respective strips to form the zipper 11. The strips 14 and 15 may be extruded separately and attached to the respective sides of the bag mouth or the strips 14 and 15 may be extruded integral with the sides of the bag mouth. The strips 14 and 15 include profiled tracks 18 and 19 extending along the length thereof and parallel to the rib and groove elements 16 and 17 and the rib and groove elements 16 and 17 preferably have complimentary cross-sectional shape such that they are closed by pressing the bottom of the elements together first and then rolling the elements to a closed position toward the top thereof. The cross-sectional shapes of the interlocking male and female elements having the rib and groove profiles 16 and 17 are the subject of the invention claimed in the related application of F. J. Herrington entitled "Rolling Action Zipper Profile and Slider Therefor" Serial No. 490,110 filed Mar. 7, 1990, now U.S. Pat. No. 5,007,143.

It is to be understood that the present invention is not limited to the shapes of the rib and groove profiles illustrated herein and that other shapes can be utilized in connection with the present invention. It is also to be understood that the present invention is not limited to the particular construction of the slider 10 disclosed herein and that other zipper sliders may be utilized in connection with the present invention.

As may be seen in FIG. 1 the slider 10 straddles the zipper 11 at the top of the bag B and is adapted for opening and closing the reclosable fastener elements 16 and 17 of the zipper 11. The slider 10 is formed from a single piece of molded plastic comprising a separator finger 9 and interlocking complimentary structure moving along the zipper 11. The separator finger 9 cooperates with the zipper 11 in such a manner as to provide a self-locking feature for the slider and a leakproof bag. This construction is described in more detail in the aforesaid related application Ser. No. 673,707. The slider 10 may be molded from any suitable plastic such for example as nylon, polypropylene, polystyrene, Delrin or ABS.

Referring to FIG. 1 it will be seen that the slider 10 is of the foldable type with wings 21 and 22 which have been folded down at the hinge structure 21a and 21d located at the top of the slider body 20 so that the wings are in the folded sidewall position against the edges of the slider body 20. The depending legs 20a and 20b are positioned on the outer side of the strips 14 and 15 and the body 20 of the slider 10 rests on the top of the tracks 18 and 19. When the sidewalls 21 and 22 are in the folded position as shown in FIG. 1 a compression-type latching mechanism (not shown) locks the sidewalls 21 and 22 in folded position with the depending legs 20a and 20b. In this assembled position, the shoulders 21c and 22c (not shown) on the sidewalls 21 and 22 are positioned beneath the bottom of the fastener element 16 and 17 to prevent the slider 10 from being lifted off the zipper 11. The foldable depending sidewalls 21 and 22 extend from an opening end 10a of the slider 10 to a closing end 10b. It will be noted that the main slider body 20 and the separator finger 9 are wider at the opening end 10a than at the closing end 10b. Similarly the sidewalls 21 and 22 and the depending legs 20a and 20b are spaced wider apart at the opening end 10a of the slider 10 to permit the separation of the rib and groove elements 16 and 17 by the finger 9 engaging the tracks 18 and 19 and are spaced sufficiently close together at the closing end 10b of the slider to press the rib and groove elements 16 and 17 into interlocking relationship as the slider 10 is moved in a fastener closing direction.

As pointed out above the opposite ends of the zipper 11 are provided with end stops 30. Each of the end stops 30 is formed from the material at the opposite ends of the zipper 11 and protrude from the zipper a distance adequate to engage the ends of the slider 10 and prevent the slider from going past the respective ends of the zipper and coming off the bag.

One method of producing the end stops 30 on the zipper 11 is illustrated in FIG. 1. Two clamps 40 and 41 are adapted to grip the strips 14 and 15 therebetween. It will be noted that each half of the clamp 40 includes a cavity 40a, 40b that is adapted for alignment with the profile portion of the strips. The profile portion includes the rib and groove elements 16 and 17 on the strips 14 and 15. Similarly, the clamp 41 includes two halves each having a cavity or pocket 41a and 41b respectively adapted for alignment with the profile portion of the strips. To clamp the profile portion of the strips between the clamps 40, 41 the sections of the clamps 40 and 41 are moved in the direction a—a indicated by the arrows. The direction a—a is transverse to the axis of the zipper 11. A hot knife 45 is positioned above the profile of the zipper 11 and is adapted to be plunged downwardly into the profile, cutting it apart and the inclined faces of the blade forcing the molten material from the profile into the respective pockets 40a, 40b in clamp 40 and pockets 41a, 41b in clamp 41. The downward vertical movement of the knife 45 is indicated by the arrow c. The knife 45 may be heated in any suitable manner such, for example, as an electrical heating element 45a housed within the knife 45. The knife 45 is adapted for vertical reciprocation transverse to the axis of the zipper as indicated by the arrows c, d in FIG. 1. When the hot knife 45 is plunged into the profiles, the heat from the knife causes the profile material to become molten so that it will be forced into the pockets 40a, 40b, 41a, 41b in the clamps 40 and 41 by the inclined faces of the knife blade. This operation fuses together the two elements 16 and 17 of the zipper profile into a unitary mass sufficiently strong to provide end stops 30 on the zipper 11 and also provides a leakproof seal at the ends of the zipper. After the end stops 30 have been formed on the zipper 11 the hot knife 45 is retracted upwardly in the direction of the arrow d and the clamps 40 and 41 are moved out of engagement with the zipper 11 as indicated by the arrows b—b.

As seen in FIG. 1 the knife 45 in cooperation with the end clamp 40 forms the end seal 30 at the end of one zipper and concurrently forms an end stop 30 at the opposite end of the adjacent zipper 11 by its cooperation with the clamp 41. It will also be noted that the formation of the end stops 30 by the method disclosed in FIG. 1 leaves a separation in the zipper 11 where a side-sealing bar can subsequently cut apart the bags along the line 43 in completing the formation of the individual bags B.

Figure 2:
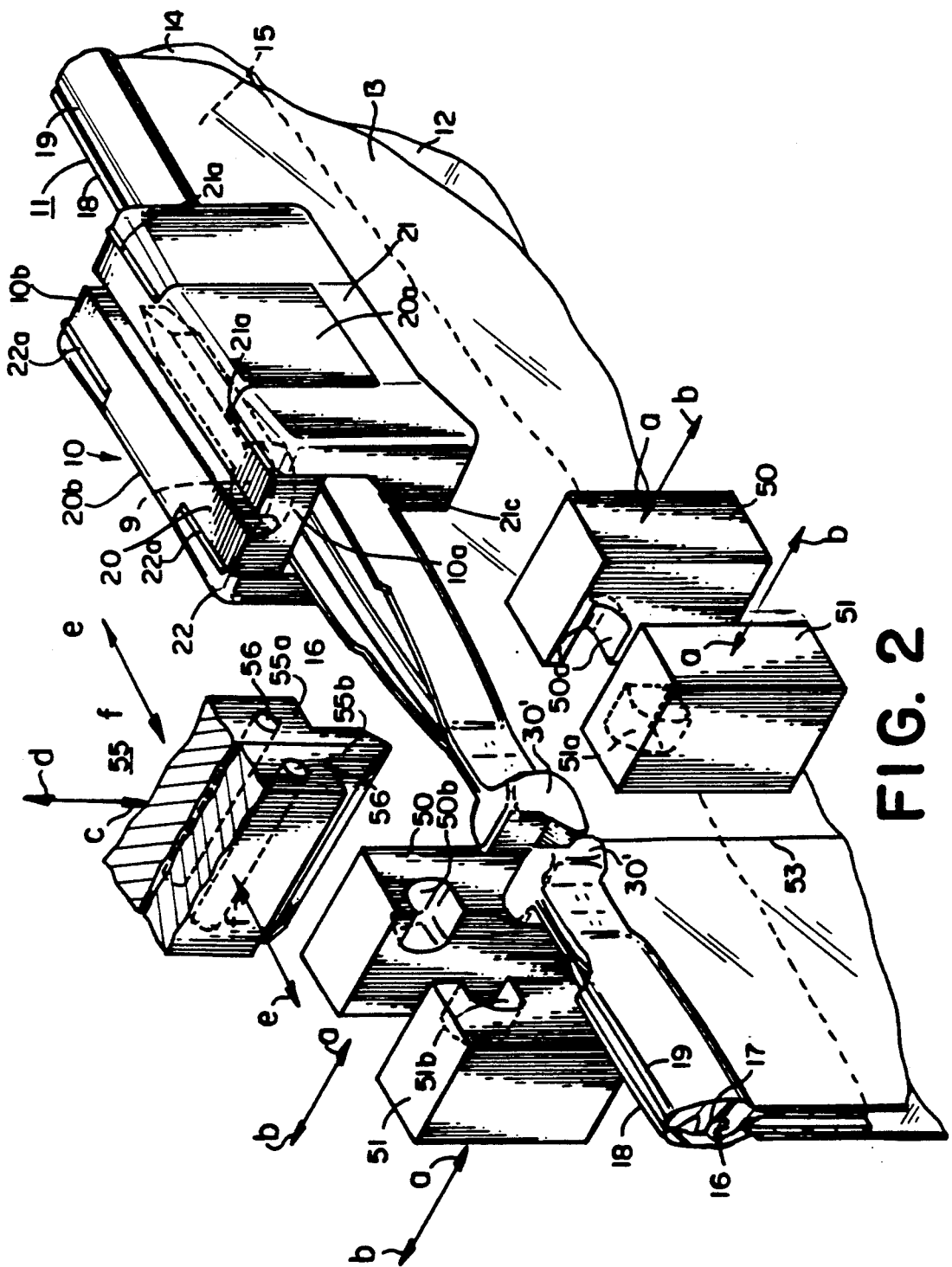
FIG. 2 is a perspective view showing other apparatus for performing the method of forming the protruding end stops on the plastic reclosable fastener in accordance with the present invention.

Referring to FIG. 2 there is illustrated an alternative apparatus for practicing the method of making protruding end stops for plastic reclosable fasteners in accordance with the present invention. The corresponding parts of the slider 10, zipper 11 and bag B have been provided with the same reference characters and the end stops identified as 30'. Different reference characters have been applied to the apparatus. Two clamps 50 and 51 are adapted to grip the strips 14 and 15 therebetween. It will be seen that each member of clamp 50 includes a cavity 50a, 50b that is adapted for alignment with the profile portion of the strips. Similarly, the clamp 51 includes two halves each having a cavity or pocket 51a or 51b respectively. To clamp the profile portion of the strips between the clamps 50, 51 the sections of the clamps 50 and 51 are moved in the direction a—a indicated by the arrows. The direction a—a is transverse to the axis of the zipper 11. A hot knife 55 comprising two pieces 55a and 55b is positioned above the profile of the zipper 11 and is adapted to be plunged downwardly as indicated by the arrow c into the profile cutting it apart. The two-piece knife 55 melts into the profile and then the two knife pieces 55a and 55b are moved apart as indicated by the horizontal arrows e—e in FIG. 2 to press the molten material from the profile into the respective pockets 50a, 50b in clamp 50 and 51a, 51b in clamp 51. Each half 55a, 55b of the knife 55 may be heated in any suitable manner such, for example, as an electrical heating element 56 housed within each half 55a, 55b of the knife 55. The knife 55 is adapted for vertical reciprocation transverse to the axis of the zipper 11 as indicated by the vertical arrows c-d in FIG. 2 and then each half 55a, 55b of the knife moves parallel to the axis of the zipper 11 as indicated by the transverse arrows e-f. The knife half 55a moves to the right in the direction of arrow e to force the molten material from the profile into the pockets 50a, 50b in clamp 50 and the knife half 55b moves to the left in the direction of the arrow e to force the molten material from the profile into the respective pockets 51a and 51b in clamp 51. After the end stops 30' have been formed on the zipper 11, the knife halves 55a, 55b are moved together as indicated by the arrows f—f to the position shown in FIG. 2. The knife 55 is then retracted upwardly in the direction of the arrow d and the clamps 50 and 51 are moved out of engagement with the zipper 11 as indicated by the arrows b—b. With the apparatus illustrated in FIG. 2 it is believed that the end stops 30' produced by this operation will be smoother than the end stops 30 produced with the apparatus in FIG. 1 since there is less sideways movement of the knife 55 relative to the clamps 50 and 51 then there is in the apparatus illustrated in FIG. 1 with movement of the knife 45 relative to the clamps 40 and 41. The operation of the apparatus in FIG. 2 fuses together the two elements 16 and 17 of the zipper profile to form a unitary mass sufficiently strong to provide end stops 30' on the zipper 11 and also provide a leakproof seal at the ends of the zipper.

Similar to the arrangement shown in FIG. 1, the knife 55 in FIG. 2 cooperates with the end clamp 50 to form the end stop 30' at one end of the zipper 11 and concurrently forms an end stop 30' at the opposite end of the adjacent zipper 11 by cooperation of the knife 55 with the clamp 51. It will also be noted that the formation of the end stops 30' by the method disclosed in FIG. 2 leaves a separation in the zipper 11 where a side-sealing bar can subsequently cut apart the bags along the line 53 in completing the formation of the individual bags B.

The method disclosed in the present application for forming the end stops on the zipper has an advantage over the method utilizing ultrasonic smashing of the zipper profile in that the present method does not slow down the bag manufacturing process. It will be understood that in the manufacture of thermoplastic bags various operations are performed at various stations and since it is a continuous process it is desirable that the various steps taken at the various stations be more or less performed in corresponding lengths of time. Where the end stops are produced by ultrasonic smashing, this operation requires a rather long cycle time thus slowing down the entire manufacturing process. The present method also has the additional advantage that strong bonds are formed between the zipper elements by the hot knife technique disclosed herein and at the same time well-defined end stops are formed.

While a preferred embodiment of the invention has been described and illustrated, it is to be understood that further modifications thereof may be made within the scope of the appended claims without departing from the spirit of the invention.

What is claimed is:

1. In the manufacture of thermoplastic bags from thermoplastic sheets having an opening with a reclosable fastener extending therealong including a slider for straddling the fastener for opening and closing the fastener, the fastener comprising a pair of flexible plastic strips connected to the walls of the bag and having reclosable interlocking male and female profile elements on the respective strips, the method of forming end stops for the slider comprising clamping together a pair of the flexible plastic strips between clamps at a seal area at the ends of the bag, the clamps having pockets therein adjacent the profile elements of the seal area, severing and heating the profile elements at the seal area with a heated knife to transform the severed ends of the profile elements into molten material and pressing the molten material into the pockets in the clamps with the heated knife thereby increasing the thickness of an area of the reclosable fastener adjacent the seal area to provide protruding end stops for preventing movement of the slider past the ends of the bag.

2. The method of claim 1 wherein the pair of flexible plastic strips is clamped between at least one pair of clamps and the heated knife is moved transversely to the axis of the reclosable fastener in severing the profile elements, and the heated knife has at least one inclined surface for pressing the molten material into the pockets in the clamps.

3. The method according to claim 1 wherein the pair of flexible plastic strips is clamped between two pairs of clamps and the heated knife is moved transversely to the axis of the reclosable fastener in severing the profile elements, and the heated knife has two inclined surfaces for pressing the molten material into the pockets in each of the clamps concurrently to form adjacent end stops.

4. In the manufacture of thermoplastic bags from thermoplastic sheets having an opening with a reclosable fastener extending therealong including a slider for straddling the fastener for opening and closing the fastener, the fastener comprising a pair of flexible plastic strips connected to the walls of the bag and having reclosable interlocking male and female profile elements on the respective strips, the method of forming end stops for the slider comprising clamping together a pair of the flexible plastic strips between clamps at a seal area at the ends of the bag, the clamps having pockets therein adjacent the profile elements of the seal area, severing and heating the profile elements at the seal area with a heated knife to transform the severed ends of the profile elements into molten material and pressing the molten material into the pocket in the clamps thereby increasing the thickness of an area of the reclosable fastener adjacent the seal area to provide protruding end stops for preventing movement of the slider past the ends of the bag, wherein the pair of flexible plastic strips is clamped between two pairs of clamps and the heated knife comprises a two-piece knife moved transversely to the axis of the reclosable fastener in severing the profile elements, each piece of the knife thereafter being moved parallel to the axis of the reclosable fastener in opposite directions for pressing the molten material into the pockets in the respective clamps concurrently to form adjacent end stops.

5. In the manufacture of thermoplastic bags from thermoplastic sheets having an opening with a reclosable fastener extending therealong including a slider for straddling the fastener for opening and closing the fastener, the fastener comprising a pair of flexible plastic strips connected to the walls of the bag and having reclosable interlocking male and female profile elements on the respective strips, the method of forming end stops for the slider comprising clamping together a pair of the flexible plastic strips between clamps at a seal area at the ends of the bag, the clamps having pockets therein adjacent the profile elements of the seal area, severing and heating the profile elements at the seal area with a heated knife to transform the severed ends of the profile elements into molten material and pressing the molten material into the pockets in the clamps thereby increasing the thickness of an area of the reclosable fastener adjacent the seal area to provide protruding end stops for preventing movement of the slider past the ends of the bag, wherein the pair of flexible plastic strips is clamped between at least one pair of clamps and the heated knife is moved transversely to the axis of the reclosable fastener in severing the profile elements, and the heated knife is thereafter moved parallel to the axis of the reclosable fastener for pressing the molten material into the pockets in the clamps.

* * * * *